US011315313B2

(12) United States Patent
Michielin et al.

(10) Patent No.: US 11,315,313 B2
(45) Date of Patent: Apr. 26, 2022

(54) METHODS, DEVICES AND COMPUTER PROGRAM PRODUCTS FOR GENERATING 3D MODELS

(71) Applicant: SONY CORPORATION, Tokyo (JP)

(72) Inventors: Francesco Michielin, Stuttgart (DE); Lars Novak, Bjärred (SE); Fredrik Mattisson, Lund (SE)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 16/962,665

(22) PCT Filed: Feb. 23, 2018

(86) PCT No.: PCT/US2018/019385
§ 371 (c)(1),
(2) Date: Jul. 16, 2020

(87) PCT Pub. No.: WO2019/164502
PCT Pub. Date: Aug. 29, 2019

(65) Prior Publication Data
US 2020/0349754 A1 Nov. 5, 2020

(51) Int. Cl.
*G06T 17/00* (2006.01)
*G06T 7/55* (2017.01)
(Continued)

(52) U.S. Cl.
CPC ............ *G06T 17/00* (2013.01); *G06T 3/0093* (2013.01); *G06T 7/55* (2017.01); *G06T 7/579* (2017.01);
(Continued)

(58) Field of Classification Search
CPC ................................. G06T 17/00; G06T 15/04
See application file for complete search history.

(56) References Cited

U.S. PATENT DOCUMENTS

2004/0189686 A1* 9/2004 Tanguay, Jr. ........... G06Q 40/08
715/716
2014/0028714 A1* 1/2014 Keating ............. H04N 21/4126
345/633

(Continued)

FOREIGN PATENT DOCUMENTS

| WO | 2015/173173 A1 | 11/2015 |
| WO | 2017/010695 A1 | 1/2017 |
| WO | 2017/115149 A1 | 7/2017 |

OTHER PUBLICATIONS

Notification of Transmittal of the International Search Report and the Written Opinion of the International Searching Authority, or the Declaration, in corresponding PCT Application No. PCT/US2018/019385 (dated May 24, 2018).

*Primary Examiner* — Phi Hoang
(74) *Attorney, Agent, or Firm* — Myers Bigel, P.A.

(57) ABSTRACT

A method of generating a 3D model may include receiving a plurality of 2D images of a physical object captured from a respective plurality of viewpoints in a 3D scan of the physical object in a first process. The method may include receiving a first process 3D mesh representation of the physical object and calculating respective second process estimated position and/or orientation information for each one of the respective plurality of viewpoints of the plurality of 2D images. The method may include generating a second process 3D mesh representation of the physical object using the plurality of 2D images, the second process estimated position and/or orientation information, and the first process 3D mesh representation of the physical object. The method may include generating a 3D model of the physical object by applying surface texture information from the plurality of 2D images to the second process 3D mesh representation of the physical object.

19 Claims, 10 Drawing Sheets

(51) Int. Cl.
  *G06T 7/70* (2017.01)
  *G06T 3/00* (2006.01)
  *G06T 15/04* (2011.01)
  *G06T 7/579* (2017.01)

(52) U.S. Cl.
  CPC ............... *G06T 7/70* (2017.01); *G06T 15/04* (2013.01); *G06T 2200/08* (2013.01); *G06T 2207/10024* (2013.01); *G06T 2207/30201* (2013.01); *G06T 2207/30244* (2013.01); *G06T 2210/44* (2013.01)

(56) References Cited

U.S. PATENT DOCUMENTS

| | | | |
|---|---|---|---|
| 2015/0254042 A1* | 9/2015 | Seitz | G06F 16/5866 382/154 |
| 2015/0271522 A1* | 9/2015 | Panahpour Tehrani | H04N 19/154 375/240.12 |
| 2017/0018088 A1* | 1/2017 | Jeong | G06K 9/00208 |
| 2017/0046833 A1* | 2/2017 | Lurie | G06T 5/008 |
| 2018/0218511 A1* | 8/2018 | Chan | G06T 7/579 |
| 2020/0302639 A1* | 9/2020 | Park | G06T 7/246 |

* cited by examiner

METHODS, DEVICES AND COMPUTER PROGRAM PRODUCTS FOR GENERATING 3D MODELS

CROSS REFERENCE TO RELATED APPLICATION

This application is a 35 U.S.C. § 371 national stage application of PCT International Application No. PCT/US2018/019385, filed on Feb. 23, 2018, the content of which is incorporated herein by reference in its entirety. The above-referenced PCT International Application was published in the English language as International Publication No. WO 2019/164502 A1 on Aug. 29, 2019.

TECHNICAL FIELD

Embodiments of the inventive concepts relate to methods and devices for image processing and more particularly to generating 3D models.

BACKGROUND

3D Scanning is a process of creating a three-dimensional (3D) model based on a series of captured images. The process of creating the 3D model may be done in real-time while the series of images are captured or may be done after the images are captured. When the 3D model is created in real-time, the process may include user interaction to facilitate the capture of images likely to produce a quality 3D model. Generating the 3D model of the object from the series of captured images may be a time-consuming process utilizing large amounts of computer processing power and computer resources. The processing capabilities may be limited in a real-time process. Accordingly, the quality of the 3D model produced in real-time may be limited.

When the 3D model is created after the images are captured, more processing capability may be available. In some examples, the captured images may be transferred to a remote server for offline processing. In some offline processing solutions, a user may not receive any feedback until after the final 3D model is generated. Some offline processing solutions may provide feedback when taking the pictures in order to maximize the angles covered by the pictures. However, some regions of an object being scanned may include more details than others. Accordingly, more pictures may be desirable from angles that cover the most detailed regions of an object.

SUMMARY

According to some embodiments of the inventive concepts, methods may be provided. A method may include receiving a plurality of two-dimensional (2D) images of a physical object captured from a respective plurality of viewpoints in a three-dimensional (3D) scan of the physical object in a first process. The method may include receiving a first process 3D mesh representation of the physical object and calculating respective second process estimated position and/or orientation information for each one of the respective plurality of viewpoints of the plurality of 2D images. The method may include generating a second process 3D mesh representation of the physical object using the plurality of 2D images, the second process estimated position and/or orientation information, and the first process 3D mesh representation of the physical object. The method may include generating a 3D model of the physical object by applying surface texture information from the plurality of 2D images to the second process 3D mesh representation of the physical object.

In some embodiments, the calculating the second process estimated position and/or orientation information and generating the second process 3D mesh representation may be iteratively repeated.

In some embodiments, a standard deviation of error of the second process 3D mesh representation with respect to the physical object may be less than a standard deviation of error of the first process 3D mesh representation with respect to the physical object.

In some embodiments, the method may include receiving intrinsic camera parameters corresponding to the plurality of 2D images and calculating updated intrinsic camera parameters based on the plurality of 2D images.

In some embodiments, the generating of the second process 3D mesh representation of the physical object may include determining an initial depth map using the first process 3D mesh representation from a perspective of a reference one of the plurality of 2D images, selecting one or more surrounding ones of the plurality of 2D images based on the second process estimated position and/or orientation information, warping the one or more surrounding ones of the plurality of 2D images to appear from the perspective of the reference one of the plurality of 2D images, and calculating an updated depth map based on a combination of the reference one of the plurality of 2D images and the warped surrounding ones of the plurality of 2D images.

In some embodiments, the method may include calculating surface normal vectors corresponding to positions in a 3D space of a plurality of feature points that are visible in ones of the plurality of 2D images. The generating the second process 3D mesh representation of the physical object may be based on the calculated surface normal vectors.

In some embodiments, the method may include receiving respective first process estimated position and/or orientation information for each one of the respective plurality of viewpoints of the plurality of 2D images. The method may include receiving a feature point map comprising positions in a 3D space of a plurality of feature points that are visible in ones of the plurality of 2D images. The calculating of the respective second process estimated position and/or orientation information may include calculating the respective second process estimated position and/or orientation information for each of the respective plurality of viewpoints of the plurality of 2D images using the plurality of 2D images, the first process estimated position and/or orientation information, and the feature point map.

In some embodiments, a standard deviation of error of the second process estimated position and/or orientation information with respect to the physical object may be less than a standard deviation of error of the first process 3D mesh representation with respect to the physical object.

In some embodiments, the calculating of the respective second process estimated position and/or orientation information may include calculating an estimated location of a feature point of the plurality of feature points within a 2D image of the plurality of 2D images based on the first process estimated position and/or orientation information, identifying the feature point within the 2D image to determine an actual location of the feature point within the 2D image, determining a displacement between the estimated location of the feature point within the 2D image and the actual location of the feature point within the 2D image, and calculating a second process estimated position and/or orientation corresponding to the 2D image that yields a smaller displacement than the displacement determined using the estimated location based on the first process estimated position and/or orientation information.

In some embodiments, the calculating of the respective second process estimated position and/or orientation information may further include minimizing a sum of displacements between a plurality of estimated locations of feature points of the plurality of feature points within ones of the plurality of 2D images.

In some embodiments, the first process may include calculating first process estimated position and/or orientation information for each one of the respective plurality of viewpoints of the plurality of 2D images, calculating a feature point map comprising positions in a 3D space of a plurality of feature points that are visible in ones of the plurality of 2D images, and generating the first process 3D mesh representation of the physical object.

In some embodiments, the first process 3D mesh representation of the physical object may be generated while capturing the plurality of 2D images.

In some embodiments, the 3D model may be a second process 3D model and the first process may further include generating a first process 3D model of the physical object by applying surface texture information from the plurality of 2D images to the first process 3D mesh representation of the physical object.

According to some embodiments, computer program products may be provided. A computer program product may include a non-transitory computer readable storage medium having computer readable program code embodied in the medium that when executed by a processor causes the processor to perform a method according to some embodiments of the inventive concepts.

According to some embodiments, devices may be provided. A device may include a processor and a memory coupled to the processor and storing computer readable program code that when executed by the processor causes the processor to perform a method according to some embodiments of the inventive concepts.

According to some embodiments, methods may be provided. A method may include capturing a plurality of two-dimensional (2D) images of a physical object captured from a respective plurality of viewpoints in a three-dimensional (3D) scan of the physical object using at least one camera of an electronic device. The method may include calculating first process estimated position and/or orientation information for each one of the respective plurality of viewpoints of the plurality of 2D images. The method may include calculating a feature point map comprising positions in a 3D space of a plurality of feature points that are visible in ones of the plurality of 2D images. The method may include generating the first process 3D mesh representation of the physical object. The method may include generating a first process 3D model of the physical object by applying surface texture information from the plurality of 2D images to the first process 3D mesh representation of the physical object. The method may include displaying the first process 3D model on a display of the electronic device and providing an option to a user of the electronic device to further process the first process 3D model. The method may include generating a second process 3D model responsive to receiving instruction from the user to further process the first process 3D model.

In some embodiments, the generating the second process 3D model may include calculating respective second process estimated position and/or orientation information for each one of the respective plurality of viewpoints of the plurality of 2D images, generating a second process 3D mesh representation of the physical object using the plurality of 2D images, the second process estimated position and/or orientation information, and the first process 3D mesh representation of the physical object, and generating the second process 3D model of the physical object by applying surface texture information from the plurality of 2D images to the second process 3D mesh representation of the physical object.

In some embodiments, the second process 3D mesh representation and the second process 3D model may be generated after the first process 3D mesh representation and the first process 3D model are generated. The first process 3D mesh representation, the first process 3D model, the second process 3D mesh representation, and the second process 3D model may be generated by the electronic device.

In some embodiments, the method may include sending the plurality of 2D images and the first process 3D mesh representation from the electronic device to an offline processing device remote from the electronic device. The first process 3D mesh representation and the first process 3D model may be generated by the electronic device and the generating of the second process 3D model may include receiving the second process 3D model from the offline processing device.

According to some embodiments of the inventive concepts, computer program products may be provided. A computer program product may include a non-transitory computer readable storage medium having computer readable program code embodied in the medium. When executed by a processor, the computer readable program code may cause the processor to perform a method according to some embodiments of the inventive concepts.

According to some embodiments of the inventive concepts, electronic devices may be provided. An electronic device may include a processor, a camera coupled to the processor, and a memory coupled to the processor. The memory may store computer readable program code that when executed by the processor causes the processor to perform a method according to some embodiments of the inventive concepts.

BRIEF DESCRIPTION OF THE DRAWINGS

The inventive concepts will be more clearly understood in view of the detailed description and the accompanying drawings.

DETAILED DESCRIPTION

Figure 1:
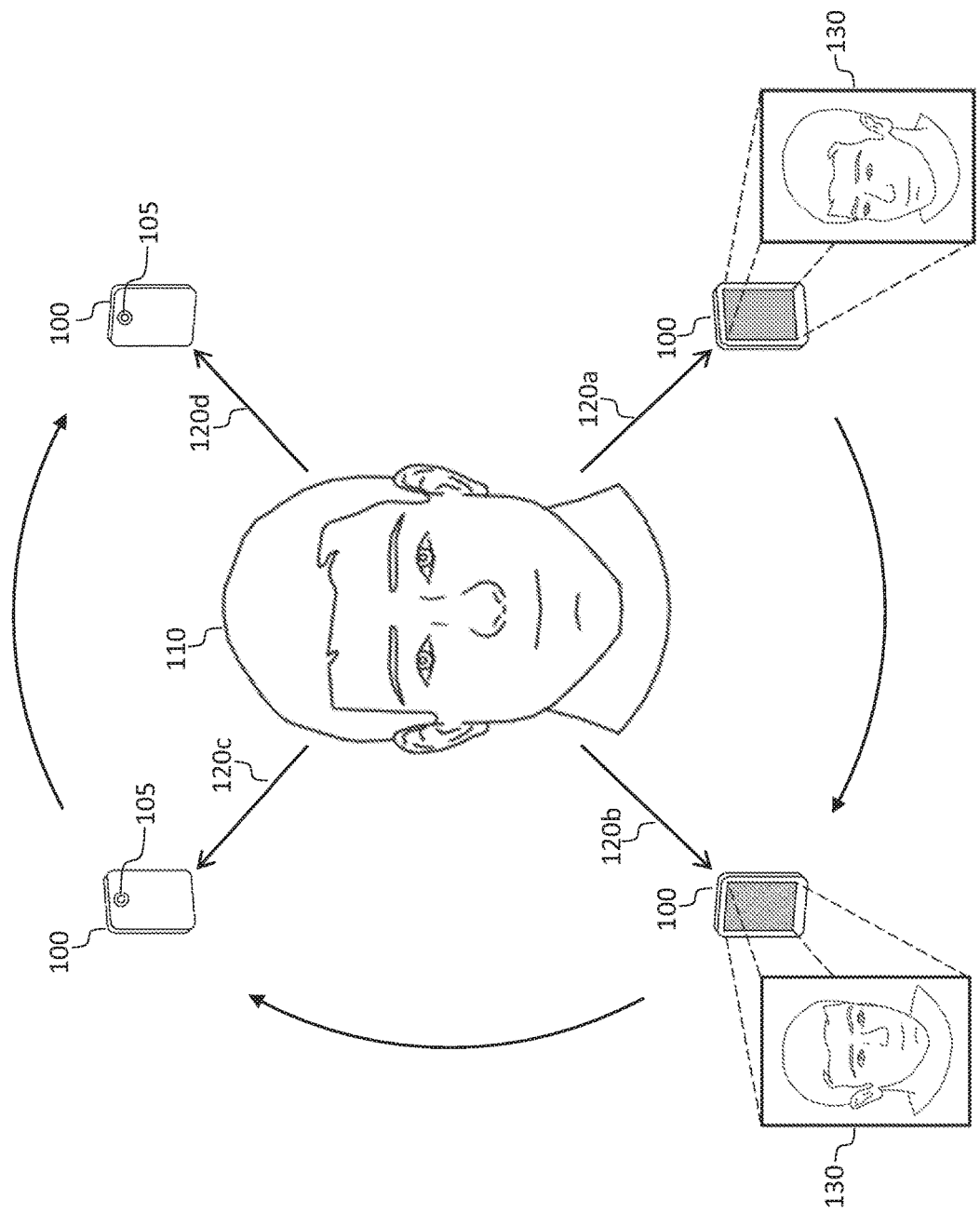
FIG. 1 is a perspective view of a device performing a three-dimensional (3D) scan of an object according to some embodiments of the inventive concepts.

Some embodiments of the inventive concepts will be described more fully herein with reference to the accompanying drawings. The inventive concepts may, however, be embodied in many different forms and should not be construed as being limited to the embodiments set forth herein. Like reference numerals refer to like elements throughout.

Some known real-time 3D processing solutions provide 3D models of limited quality due to limitations of processing capabilities available in an electronic device in real-time. Some known post-processing 3D processing solutions provide limited feedback to a user while data is collected. Some embodiments of the inventive concepts provide a combination of the two solutions that provide the benefits of each. In other words, a first 3D model may be generated in real-time to provide feedback to a user while a series of images are captured. If a more detailed 3D model is desired, a more optimal model may be generated in a secondary process. Moreover, some embodiments provide improved computational efficiency by saving intermediate computational results of the real-time process and using this data in the secondary process.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the present invention. As used herein, the singular forms "a," "an" and "the" are intended to include the plural forms as well, unless the context clearly indicates otherwise. It will be further understood that the terms "comprising", "including", "having" and variants thereof, when used in this specification, specify the presence of stated features, steps, operations, elements, and/or components, but do not preclude the presence or addition of one or more other features, steps, operations, elements, components, and/or groups thereof. In contrast, the term "consisting of" when used in this specification, specifies the stated features, steps, operations, elements, and/or components, and precludes additional features, steps, operations, elements and/or components.

Aspects of the inventive concepts may include using the live result, and data deliberately gathered during the live scan, as an input for a post-processing solution, constructed to give a desired result for this setup. The combination of the live processing and post-processing may provide a high success rate compared to some solutions and may provide faster results.

FIG. 1 is a perspective view of a device performing a three-dimensional (3D) scan of an object according to some embodiments of the inventive concepts. Referring to FIG. 1, a device 100 may be used to perform a 3D scan of an object 110. The object 110 may be an inanimate object, such as, for example, a toy, a sculpture, a component, or the like, or the object 110 may be an animate object, such as a person, a portion of a person, an animal, or the like. FIG. 1 illustrates the object 110 as the head portion of a person. A person or other animate object may maintain substantially motionless during a 3D scan to reduce errors in the resulting 3D model.

The device 100 may be an electronic device including a camera 105 capable of capturing two-dimensional (2D) images and a processor capable of processing the images. FIG. 1 illustrates the device 100 as a smartphone device, however embodiments are not limited thereto. For example, the device 100 may be a tablet, laptop, or other computing device. The camera 105 may be integrated into the device 100, may be physically connected to the device 100, or may be remote from the device 100 with a communication interface therebetween. For example, the camera 105 may be wirelessly connected to the device 100.

The device 100 may begin at a first position and orientation 120a with respect to the object 110. For example, the device 100 may be pointed at the object 110 from a first angle with respect to the object 110 and at a first distance from the object 110 such that the object 110 is within a field of view of the camera 105. The device 100 may capture a first image 130 of the subject 110 from the first position and orientation 120a. For example, a user of the device 100 may operate an application on the device 100 to begin a 3D scan. The user may move the device 100 around the object 110 to capture additional images from additional positions and/or orientations. For example, the user may move the device 100 to a second position and orientation 120b to capture a second picture 130 and may continue moving the device 100 to a third position and orientation 120c and a fourth position and orientation 120d to capture additional images. The user may move the device 100 to many positions and/or orientations to provide sufficient coverage of the object 110 for generating a detailed 3D model of the object 110. Although some embodiments may be described with respect to movements of the device 100, it will be understood that some embodiments may include a stationary processing device 100 and movement of a separate camera 105. In some embodiments, the camera 105 may remain stationary and the object 110 may be rotated.

The application on the device 100 may provide feedback to the user to assist in providing the desired coverage of the object 110. For example, a display of the device 100 may show a field of view of the camera 105. In some embodiments, the device 100 may further augment the displayed field of view to show a plurality of feature points that are visible in more than one of the pictures that have been captured. A user may move the device 110 to a different angle in order to provide a field of view that allows the device 100 to capture feature points across the subject 110. In some embodiments, the device 100 may show a mesh frame of a model of the subject 110. The user may move the device 100 to provide a complete coverage of the mesh frame. In some embodiments, the device 100 may show a textured 3D model of the subject 110. The user may move the device 100 to provide a sufficient 3D model.

Figure 2:
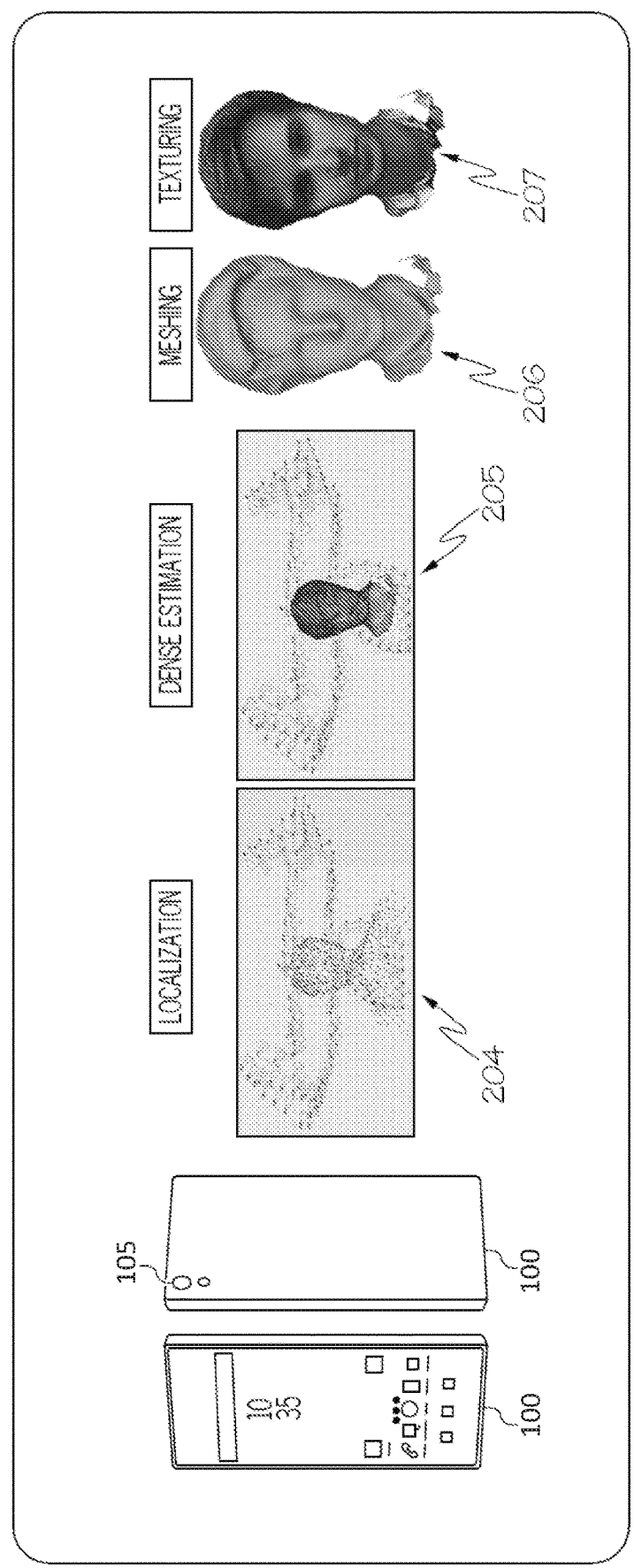
FIG. 2 is a flow chart illustrating processing operations of a live scan according to some embodiments of the inventive concepts.

FIG. 2 is a flow chart illustrating processing operations of a live scan according to some embodiments of the inventive concepts. Referring to FIG. 2, a live scan may include operations of localization 204, dense estimation 205, meshing 206, and texturing 207. However, embodiments are not limited thereto. In some embodiments, one or more of the operations 204-207 may not be required or may be replaced with other operations. The operations 204-207 illustrate only some processing methods, which may be used to produce a 3D model from a live scan.

Localization 204 may include 3D map and/or depth determination and pose determination. Pose determination may utilize Simultaneous Localization and Mapping (SLAM), including image-based positioning techniques, to track a location (including position and/or orientation) of the image capture device in an operating environment. 3D map determination may involve calculation of 3D coordinates or related information (e.g., X, Y, and/or Z coordinates) from a set of 2D images by identifying matching elements in two or more images and triangulating the positions of the matched elements in 3D space. Dense estimation 205 may include creating depth maps corresponding to the set of 2D images. Multiple depth maps can be combined in meshing 206 to create an initial polygon mesh representation of a subject represented in the set of images. Meshing 206 may include sculpting to subdivide surfaces of the initial polygon mesh representation to derive adjusted locations and/or displacements for the vertex positions of some polygons, and storing the adjusted locations and/or displacements in an image map. The values of respective vertices of those polygons may thus be adjusted from their initial value, such that the sculpted model may iteratively define portions with an adjusted topology (representing additional detail) relative to the initial or previous polygon mesh representation. That is, after sculpting, the mesh representation may include vertices whose values have changed from the initial value, and vertices whose values have not changed from the initial value. Texturing 207 and other material application operations may involve applying colors from the original set of images to the 3D mesh representation, for example, by projecting the images onto the mesh and/or segments thereof. Operations for creating a 3D model, such as those described above, may be collectively referred to herein as 3D scanning.

A scan may be based on movement of the camera 105 around the object 110 while capturing 2D images. The camera motion may include several camera poses. Each of the 2D images has a pose associated with it, which includes the orientation and position of capture by the camera 105 of the 2D image. The position of the pose associated with a given 2D image may be in relation to the first image captured by the camera 105 during the scan. For example, the first 2D image 130a may be designated as having a position in a 3D space as being X coordinate=0, Y coordinate=0, and Z coordinate=0 and the orientation as being zero degrees from the normal from the object to the camera. Subsequent 2D images may have an orientation and position that is with respect to this first 2D image that was captured during the scan. Other techniques of defining the orientation and/or position of an image capturing device may also be used.

Figure 3A:
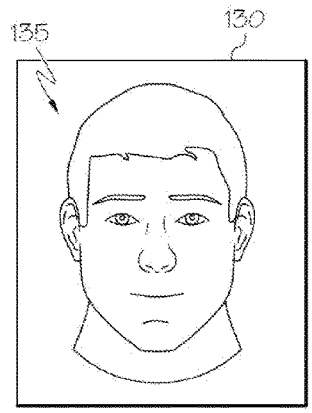
FIGS. 3A to 3C are two-dimensional (2D) images of a person's head oriented in various directions according to some embodiments of the inventive concepts.
Figure 3B:
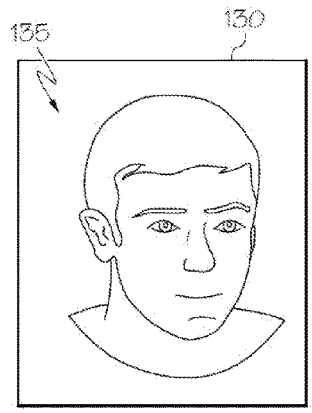
Figure 3C:
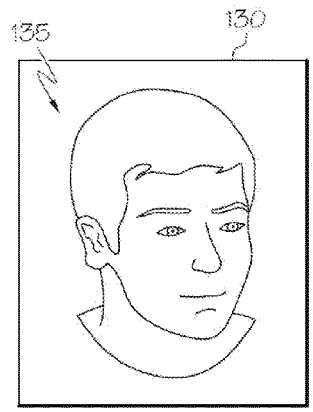

FIGS. 3A to 3C illustrate images of a person's head oriented in various directions according to some embodiments of the inventive concepts. In other words, various poses are illustrated in FIGS. 3A to 3C. Referring to FIG. 3A, a first picture 130 may include a head that is oriented straight at the camera 105. Referring to FIG. 3B, a second picture 130 may include the face offset from the perpendicular by an angle, for example by about 30 degrees. Referring to FIG. 3C, a third picture 130 may include the face offset from the perpendicular by another angle, for example by about 45 degrees. The localization processing operation 204 may include determining the poses corresponding to these various facial angular orientations of the 2D images.

Localization 204 of FIG. 2 may be used to determine a 3D map and/or poses, which may be important factors of creating a 3D representation. Some embodiments described herein arise from the recognition that, in image processing operations to create a 3D representation of an object 110 from captured 2D images 130, the 3D representation may be degraded if the corresponding pose of the camera 105 and/or a related 3D map cannot be accurately determined. Some embodiments described herein may include improved techniques to create and/or update a 3D map and/or determine accurate estimated poses of the image capture device. Recursive techniques may include repeated application of a rule, definition, or procedure to successive results. Any of the operations described herein as being recursive may be performed in a causal manner on the poses and operations described as being non-recursive may be performed in an a causal manner on the poses.

More particularly, a robust and accurate method that can deliver real-time pose estimates and/or a 3D map for 3D reconstruction and provide enough information for camera calibration is described in various embodiments. The inventive concepts described herein combine a real-time phase with a post-processing system. Initialization of the 3D map or structure in the live phase may be based on the scene or the scene structure that is discerned from a series of 2D images 130 or frames. Sequential tracking or sequential updating may also be referred to as recursive pose and positioning. During the live phase, a non-recursive initialization of the 3D map and the poses may be used to localize the camera 105 for 2D images 130. An initial map of the scene, which is represented by a set of 3D coordinates corresponding to salient image points that are tracked between sequential frames, may be constructed and the camera poses 120 (orientation and position of the camera along its trajectory) may be computed.

The location of the camera 105 corresponding to ones of the 2D images 130 may be estimated by finding correspondences of points between different ones of the 2D images 130. In other words, points which can be found in more than one of the 2D images 130, for example a tip of a nose, a side of an eye, etc., may be correlated between the images 130. In the localization operation 204 of the live san, ones of the 2D images 130 may be processed one frame after another in order to give real time feedback and to limit the memory used. The sequential processing of the ones of the 2D images 130 may be prone to a problem of 2D drift. For example, the processing the images 130 may have an error due to, for example, a limit of precision in calculating the 2D matches.

Because the 2D matching data is used as input for processing subsequent ones of the images 130, errors may accumulate and increase over time.

Criteria, such as, for example, the number of tracked points or the pose change, may be used to decide if the current frame should become a key-frame. Key frames are selected as representative sets of frames to be used in the localization. If a given frame is selected as a key frame, a local/global bundle adjustment (BA) may be used to refine the key-frames positions and/or to refine or triangulate new 3D points. During the live processing, a global feature database may be created and populated with globally optimized landmarks. Each landmark may be associated with some stored information such as the related 3D coordinates, a list of frames/key-frames where it was visible, and/or a reference patch. After the initialization phase, a set of anchor landmarks may be available when the post-processing phase is entered. In particular, the initial set of global features may reduce and/or remove errors resulting from a drift problem of live localization.

Figure 4:
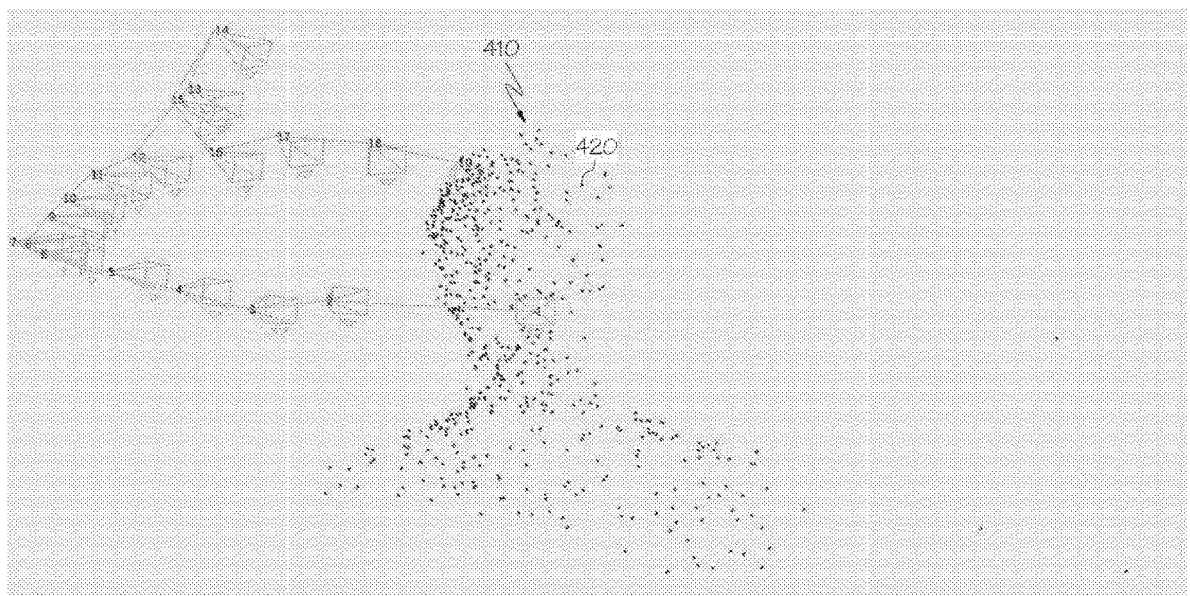
FIG. 4 is a perspective view illustrating a localization operation according to some embodiments of the inventive concepts.

FIG. 4 illustrates a localization operation according to some embodiments of the inventive concepts. A localization operation of FIG. 4 may correspond to operation 204 of FIG. 2. Referring to FIG. 4, several 2D images of an object such as the face of a person may be collected during a portion of a scan. Poses 1 to 19 may include positions and orientations that are represented in FIG. 2 as rectangular pyramid shapes. The poses may be estimated at various camera viewpoints of the 2D images 130. A 3D map 410 including various 3D points 420 may be constructed. The 3D points 420 may be triangulated from identifying features in the 2D images 130. The 3D points 420 may be referred to as feature points 420 or as a point cloud 420 and the 3D map 410 may be referred to a feature point map 410.

Figure 5:
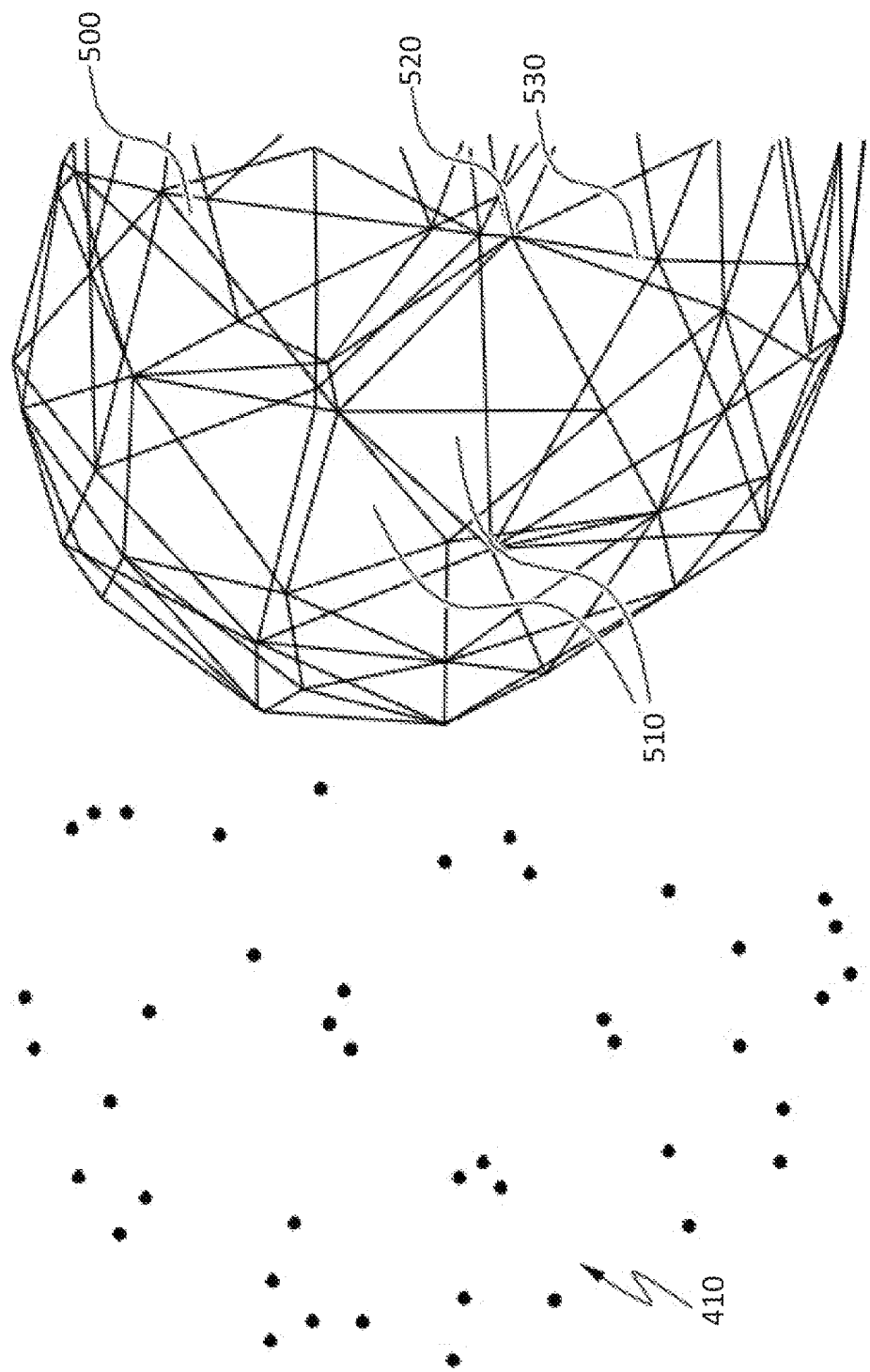
FIG. 5 is a perspective view illustrating a meshing operation according to according to some embodiments of the inventive concepts.

FIG. 5 illustrates a meshing operation according to some embodiments of the inventive concepts. A mesh representation 500 of the object 135 may be generated in the meshing operation 206 based on the 2D images 130 and based on the feature point map 410 from the localization operation 204. The mesh representation 500 may be composed of a plurality of polygons 510 including edges 530 and vertices 520.

Respective vertices 520 of the mesh representation 500 may be associated with the surface of the object 135 being scanned and tracked. The feature points 420 may represent contours and/or other features of the surface of the object 135. Operations for generating a mesh representation 500 of the object 135 may attempt to map the plurality of points 420 extracted from a 2D image 130 of the object 135 onto the polygons 510 of the mesh representation 500. The mesh representation 500 may be incrementally improved based on subsequent images 130, as the subsequent images 130 may provide additional points 420 which may be mapped to the plurality of polygons 510 of the mesh representation 500.

Refining the mesh representation 500 given a point cloud 420 may involve mathematically projecting the 3D location of the plurality of points 420 inferred from an image into and/or onto the mesh representation 500. For each point of the plurality of points 420, an analysis may be performed to determine whether the point lays on the mesh representation 500, or whether the point is off (e.g., above/below/beside in a 3D space) the mesh representation 500. If the point is on the mesh representation 500, the point may be associated with a polygon of the polygons 510 of the mesh representation 500 that contains the point. If the point is off the mesh representation 500, it may indicate the mesh representation 500 needs to be adjusted. For example, the point may indicate that the arrangement of the polygons 510 of the current mesh representation 500 is inaccurate and needs to be adjusted.

Referring again to FIG. 2, colors from the images 130 may be overlaid onto the polygons 510 to create a 3D model of the object 110. The resulting 3D model may be shown on a display of the device 100. For example, in some embodiments, a point of view of the camera 105 may be augmented with a display of the 3D model to aid the user in determining when enough images 130 have been captured to create a detailed 3D model. In some embodiments, the 3D model of the object 110 may be shown after the images 130 have been captured. A user may analyze the generated 3D model to determine if more images 130 are required. For example, a portion of the object 110 may not have been captured in the images 130 and additional angles may be required. In another example, a portion of the object 110 may require additional detail and further angles and/or closer distance images may be desired.

A user may be completely satisfied with the 3D model and may desire to end the 3D scanning process. The user may output the 3D model to be shared with others as a 3D picture, to be physically built with a 3D printer, to be incorporated into other software, such as an avatar, or for other purposes for which 3D models may be used.

A user may be presented with an option to perform a second process in which additional processing is used to improve qualities of the 3D model.

Figure 6:
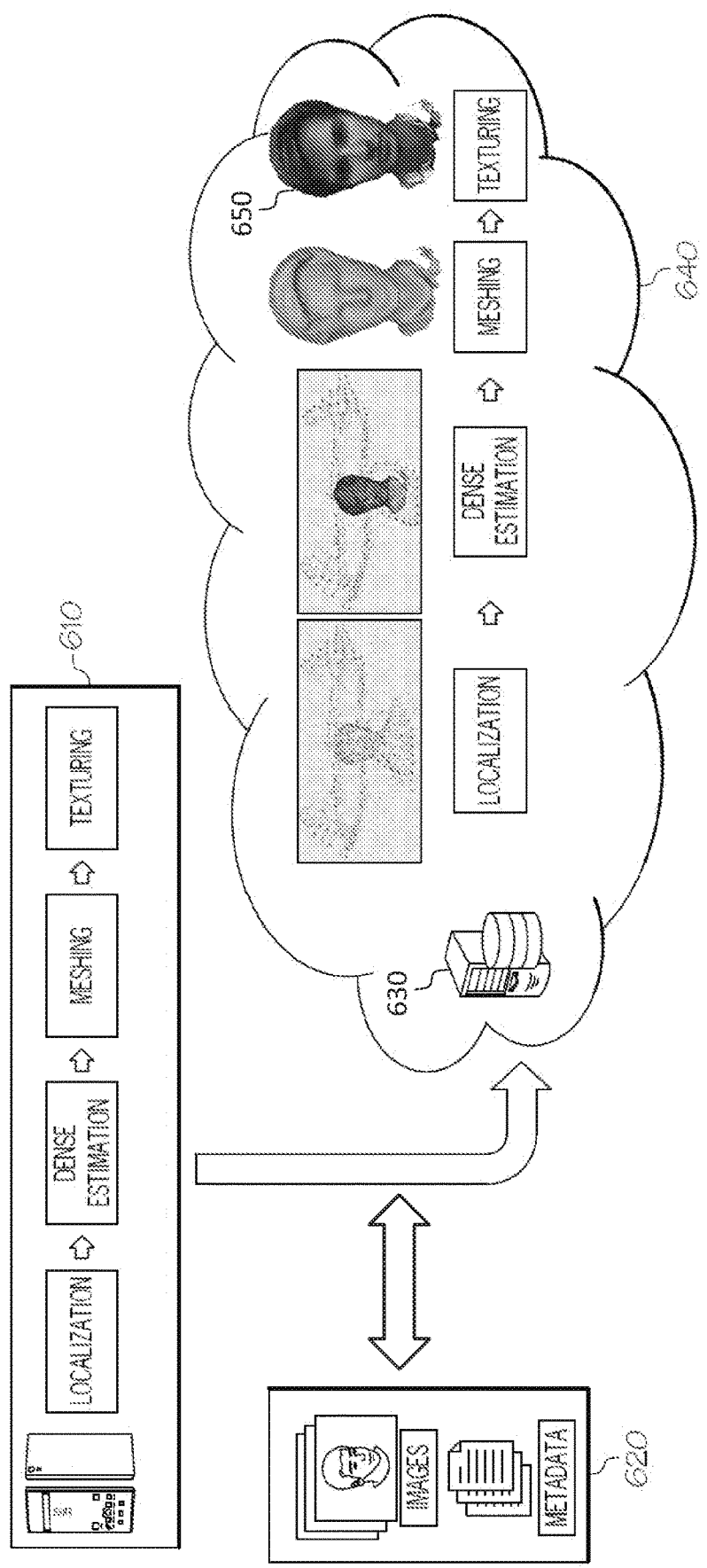
FIG. 6 is a flow chart illustrating operations of methods to produce a 3D model according to some embodiments of the inventive concepts.

FIG. 6 is a flow chart illustrating operations of methods to produce 3D models according to some embodiments of the inventive concepts. Referring to FIG. 6, a live scan 610 may be performed of an object 110 using a device 100 to produce a first 3D model of the object 110. A user of the device 100 may select an option to perform post-processing operations 640 at a 3D modeling system 630 to generate a second 3D model 650 of the object 110. The second 3D model 650 may have improved qualities as compared to the first 3D model of the live scan 610. For example, the post-processing operations 640 may reduce errors that may be present in the first 3D model.

The device 100 may transmit data 620 to the 3D modeling system 630 for use in performing the post-processing operations 640. For example, the device 100 may transmit the images 130 and metadata. The metadata may include one more of the pose information generated by the localization operation 204 corresponding to the position and/or orientation of the camera 105 with respect to the object 110 for the images 110, the feature point map 410 generated by the localization operation 204, and/or the mesh representation 500.

In some embodiments, the 3D modeling system 630 may be remote from the device 100. For example, the 3D modeling system 630 may be a server that provides a cloud computing service and is connected to the device 100 via a network. Embodiments may be described with respect to a remote 3D modeling system 630, however it will be understood that in some embodiments the post-processing operations 640 may be performed on the device 100 and it may not be necessary to transmit the images 130 or the metadata.

In some embodiments, the images 130 may include key frames that were identified from the 2D images captured by the camera 105. Key frames may be selected using a variety of techniques, such as those based on pose change, angular change, and/or based on matches between frames. Matches between frames may be quantified by a ratio of matching pixels between two images. A smaller ratio of matching pixels may indicate a greater change in the content of the two images, thus identifying the two images as key frames. Two images that have a significant number of matching pixels may be determined to be a match, and removed from consideration as a key frame. In other words, when there are not many matches between two images, a key frame may be identified.

Figure 7:
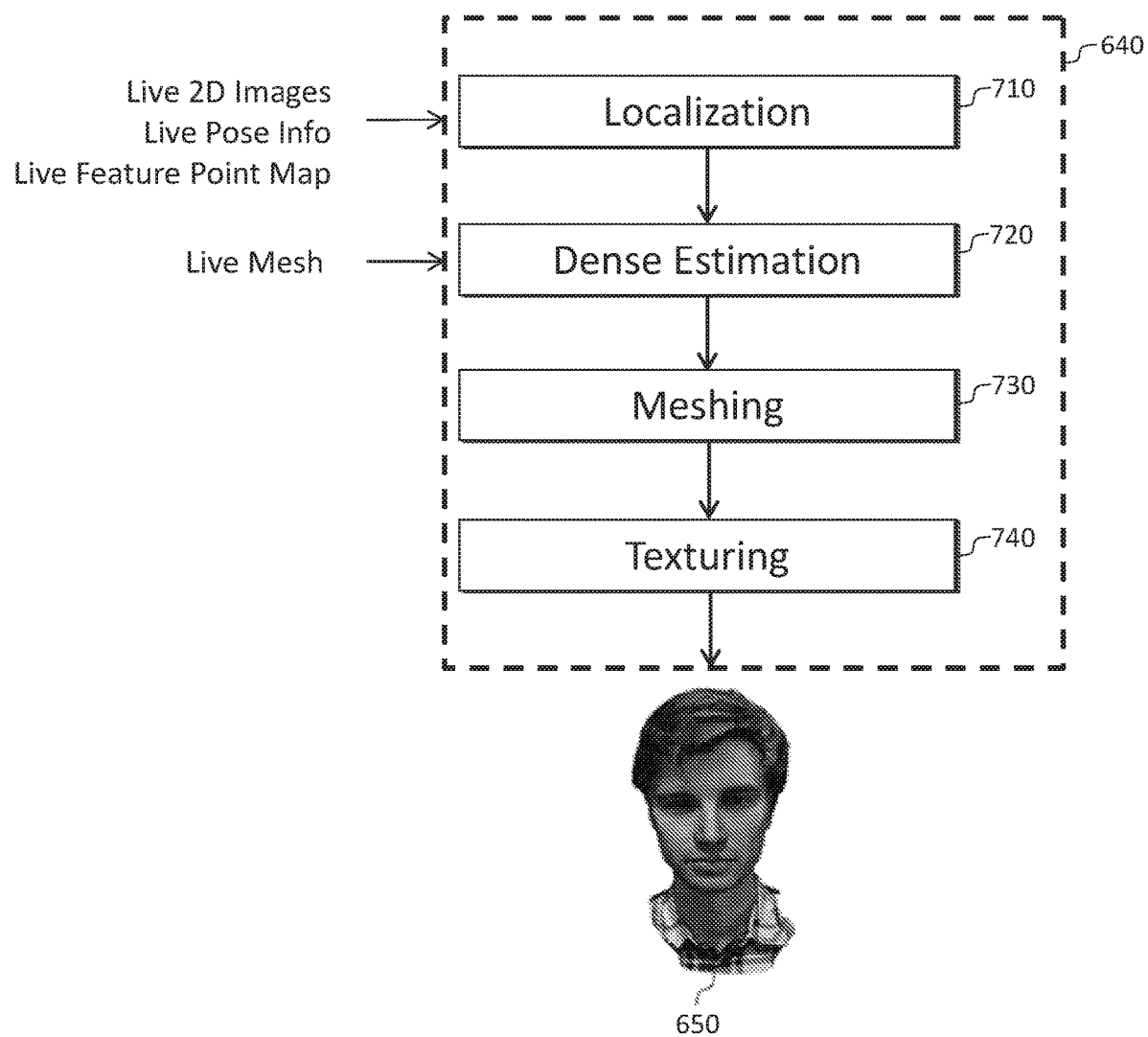
FIG. 7 is a flow chart illustrating the post-processing operations of FIG. 6 according to some embodiments of the inventive concepts.

FIG. 7 is a flow chart illustrating the post-processing operations of FIG. 6 according to some embodiments of the inventive concepts. Referring to FIG. 7, a method of post-processing to generate a 3D model 650 may include operations of localization 710, dense estimation 720, meshing 730, and texturing 740. The post-processing operations may be initialized with data that was generated during the live scan 610 in order to reduce a number of computations required to produce the 3D model 650 having a higher quality than the 3D model produced by the live scan 610. In other words, the post-processing operations may benefit from calculations already performed in the live scan 610 to improve computational efficiency.

Figure 8:
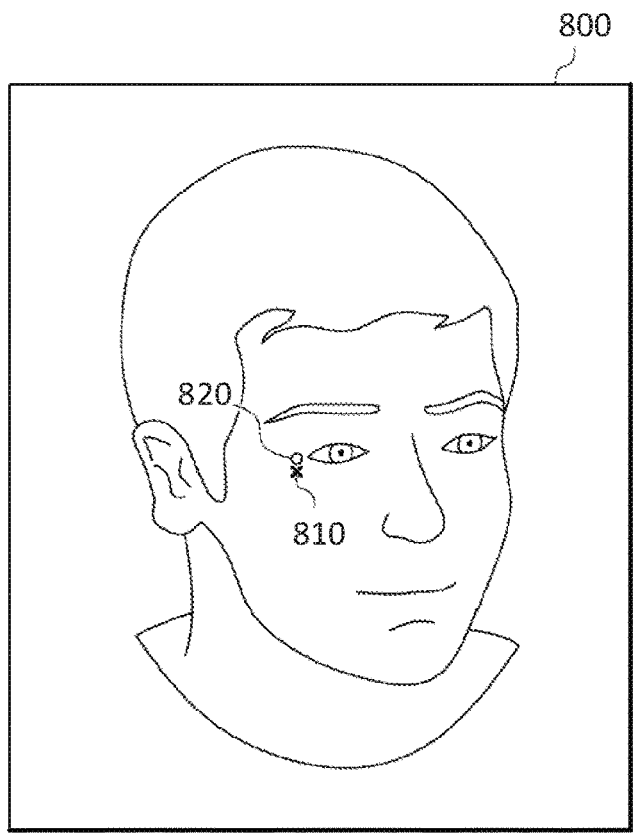
FIG. 8 is an image illustrating a post-processing localization operation according to some embodiments of the inventive concepts.
Figure 9:
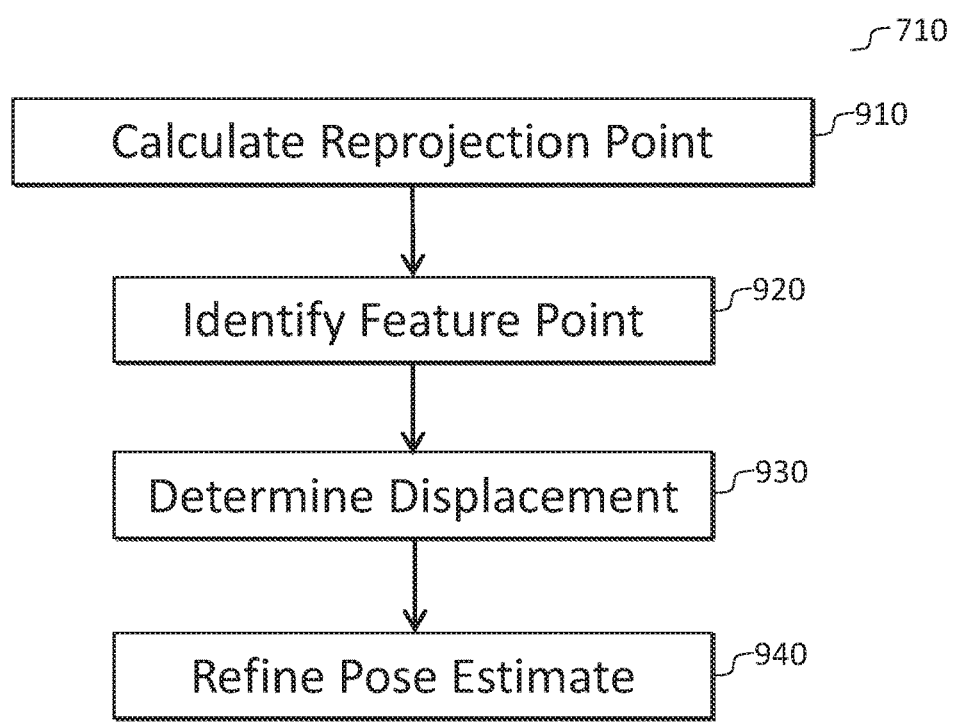
FIG. 9 is a flow chart illustrating operations of a post-processing localization operation according to some embodiments of the inventive concepts.

FIG. 8 is an image illustrating a post-processing localization operation according to some embodiments of the inventive concepts. FIG. 9 is a flow chart illustrating operations of a post-processing localization operation according to some embodiments of the inventive concepts. Referring to FIGS. 4, 8, and 9, in an operation 910 of the localization operation 710, a reprojection point 810 may be calculated for a feature point 820 in an image 800. For example, the feature point 820 may be selected from the feature points 420 of the live scan feature point map 410 that are visible in the image 800 that may be one of the 2D images 130. In other words, the post-processing localization operation 710 may be initialized with the live pose information and live feature point map 410 from the live scan 610 such that a reprojection point 810 may be easily calculated. In an operation 920, the location of the feature point 820 may be identified within the image 800. As illustrated in FIG. 8, the feature point 820 may not exactly align with the reprojection point 810 within the image 800. A displacement between the reprojection point 810 and the feature point 820 may correspond to a reprojection error. The reprojection error may be caused, for example, by an error in the pose information calculated during the localization operation 204 of the live scan 610. In an operation 930, the displacement may be determined by calculating a distance, for example as measured in pixels, between the reprojection point 810 and the feature point 820.

In an operation 940, refined pose information may be calculated to reduce the displacement error. For example, one or more of the estimated location and/or orientation of the camera 105 corresponding to the image 800 may be changed from the live pose data to a new value that produces a shorter distance between the reprojection point 810 and the feature point 820. Pose information for ones of the images 130 may be recalculated to reduce an overall projection error for visible ones of the feature points 420. An overall projection error may be calculated as an average of the projection error of the respective visible ones of the feature points 420, however embodiments are not limited thereto. The post-processing localization operation 710 may be iterative repeated to produce post-processed pose information with reduced reprojection error. Accordingly, the 3D model 650 produced with the post-processed pose information of the post-processing localization operation 710 may have reduced errors and may have an improved quality as compared to the 3D model of the live scan 610.

The live pose information may include errors, for example drift, because the images 130 may have been processed sequentially in the localization operation 204 of the live scan 610 in order to give real time feedback and to limit the memory used. In the localization operation 710 of the post-processing operations 640, the drift may be reduced by matching all correspondences of a feature point 820 to the reference image 800, which may limit the growing of the error. Iterative processing may further improve consistency and reduce errors. Updated pose information and feature point data with reduced errors may be calculated based on the updated correspondences.

In some embodiments, one or more camera parameters corresponding to the images 130 may be received. The camera parameters may include, for example, a focal length of the camera 105, principal points, skew, lens distortion, etc. The camera parameters may be updated in the post-processing operations 640 in addition to the updating of the pose information. The camera parameters may be intrinsic camera parameters as opposed to extrinsic parameters such as the pose information.

Figure 10:
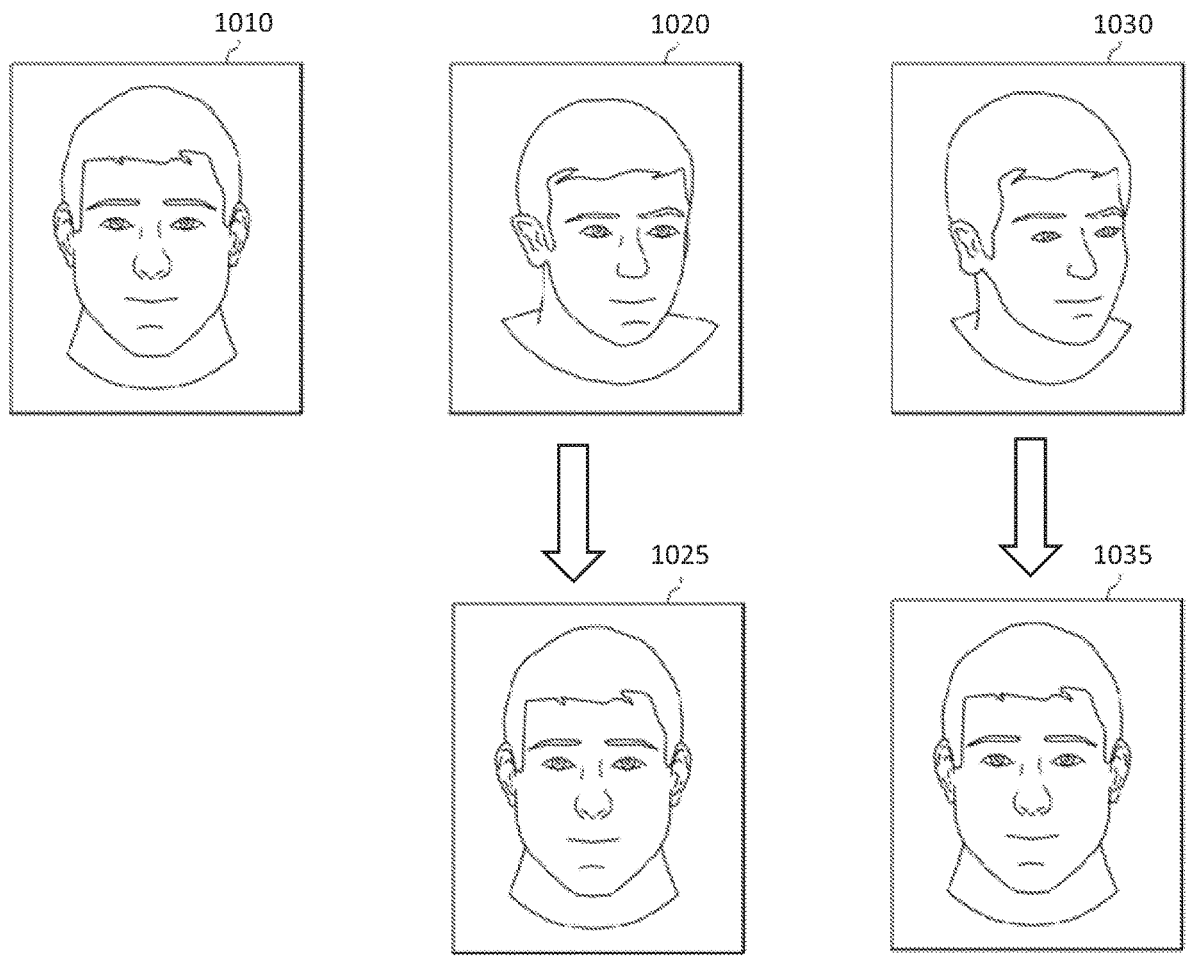
FIG. 10 illustrates example images used in a post-processing meshing operation according to some embodiments of the inventive concepts.
Figure 11:
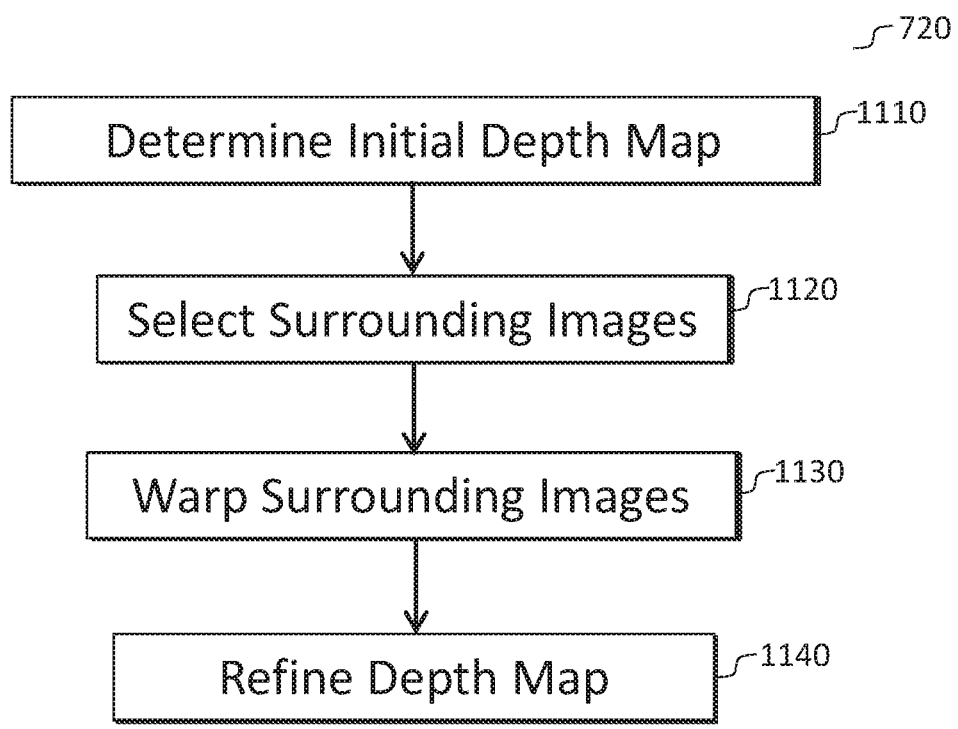
FIG. 11 is a flow chart illustrating operations of a post-processing dense estimation operation according to some embodiments of the inventive concepts.

FIG. 10 illustrates example images used in a post-processing dense estimation operation according to some embodiments of the inventive concepts. FIG. 11 is a flow chart illustrating operations of a post-processing dense estimation operation according to some embodiments of the inventive concepts. Referring to FIGS. 5, 10, and 11, the dense estimation operation 720 may include an operation 1110 in which an initial depth map may be calculated for an image 1010 of the 2D images 130 based on information from the live scan 610, for example from the mesh representation 500 of the live scan 610. In other words, the live mesh representation 500 may be projected into the pose of the image 1010 to define a depth mask. The depth mask may correspond to a region of the image 1010 that includes the object 110. In some embodiments, the operation 1110 may use the updated pose information from the post-processing localization operation 710. The projected mesh may also be used to calculate the initial depth map within the depth mask region. In other words, for pixels of the image 1010 within the depth mask region, a distance may be calculated between the camera 105 and the object 110 based on the mesh representation 500 and the pose information.

In an operation 1120, one or more surrounding images 1020, 1030 may be selected. The surrounding images 1020, 1030 may be selected from among the images 130 that have similar pose information. The difference between the poses of the images 1010, 1020, and 1030 may be exaggerated for purposed of illustration and selected surrounding images 1020, 1030 may be from a more similar camera pose to that of the image 1010 than illustrated. In an operation 1130, the images 1020, 1030 may be warped to produce images 1025, 1035 that appear from the same perspective as the image 1010. For example, the initial depth map may be used to shift portions of the surrounding images 1020, 1030. The image 1010 may be combined with portions of the warped images 1025, 1035. For example, a portion of the image 1010 may include one or more defects that produce errors in the 3D model. For example, a motion, such as a blinking eyelid, may have occurred while the image 1010 was being captured. In another example, a surrounding light source may produce a reflection in the image 1010 that was not visible in the images 1020, 1030. Accordingly, the operation of combining the images 1010, 1025, and 1035 may include applying a weighted mask to the images 1020, 1030 in order to reduce errors. In an operation 1140, an updated depth map may be calculated based on the combination of the images 1010, 1025, and 1035. The post-processing dense estimation operation 720 may be iterative repeated to produce post-processed pose information with reduced error.

In some embodiments, the updating of the depth map may include calculating a surface orientation corresponding to the feature points 420. For example, a surface normal vector may be calculated for each of the feature points 420. The surface normal vectors may be orthogonal to an estimated surface of the object 110. The surface normal vectors may be used to calculate the updated depth map.

In the meshing operation 730, the updated depth map may be used to produce a post-processed mesh representation of the object 110 and in the texturing operation 740, surface texture information may be applied to the post-processed mesh representation. Accordingly, the 3D model 650 produced with the post-processed depth maps of the post-processing dense estimation operation 720 may have reduced errors and may have an improved quality as compared to the 3D model of the live scan 610.

In some embodiments, one or more of the operations 710-740 may be iteratively repeated to reduce errors. The post-processing operations 640 may produce the 3D model 650. In embodiments where the 3D modeling system 630 is remote from the device 100, the 3D model 650 may be transmitted to the device 100. For example, the post-processing operations 640 may be provided to the user of the device 100 as a cloud service. The user may therefore initially receive the live 3D model based on the live scan 610 and may subsequently receive the higher quality 3D model 650 after the post-processing operations 640 complete.

Example embodiments are described herein with reference to block diagrams and/or flowchart illustrations of computer-implemented methods, apparatus (systems and/or devices) and/or computer program products. It is understood that any block within the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions, which implement the functions/acts specified in the block diagrams and/or flowchart block or blocks.

Figure 12:
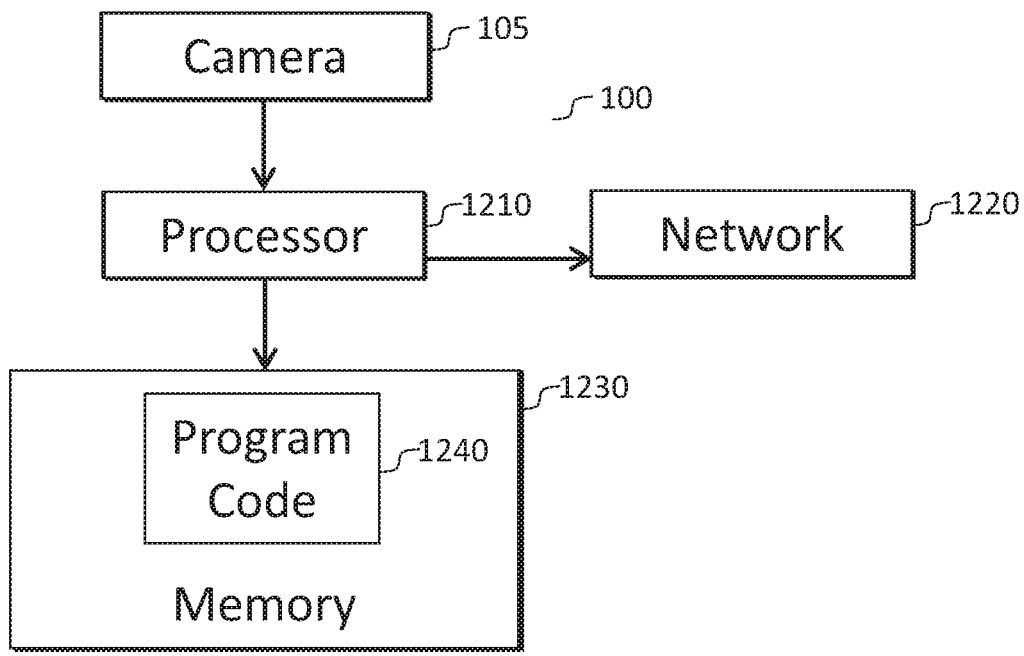
FIG. 12 is a block diagram schematically illustrating a device according to some embodiments of the inventive concepts.

FIG. 12 is a block diagram schematically illustrating a device according to some embodiments of the inventive concepts. Referring to FIG. 12, the device 100 may include a camera 105, a processor 1210, a network interface 1220, and a memory 1230 including computer readable program code 1240. In some embodiments, the device 100 may be a handheld device containing digital camera components embodied within a camera body, may be a cellular communication device, such as a smartphone, or may be another type of device that may be moved around the object 110 to capture the images 130. In some embodiments, the device 100 may remain stationary while the camera 105 moves around the object 110. The camera 105 may be coupled to the processor 1210 by a communications bus. In some embodiments, the camera 105 may be external to the device 100 including the processor 1210 and may be connected to the processor 1210 via a cable or wireless interface. The communications bus may be used by the processor 1210 to control the camera 105 and to receive the images 130 from the camera.

The processor 1210 may include one or more data processing circuits, such as a general purpose and/or special purpose processor, e.g., microprocessor and/or digital signal processor, that may be collocated or distributed across one or more networks. The processor 1210 may be configured to execute the computer readable program code 1240 in the memory 1230 to perform at least some of the operations and methods of described herein as being performed by the device 100.

The memory 1230 may include a non-transitory computer readable storage medium having computer readable program code 1240 embodied in the medium. In some embodiments, a computer program product may include the non-transitory computer readable storage medium 1230 having the computer readable program code 1240 embodied in the medium 1230.

Figure 13:
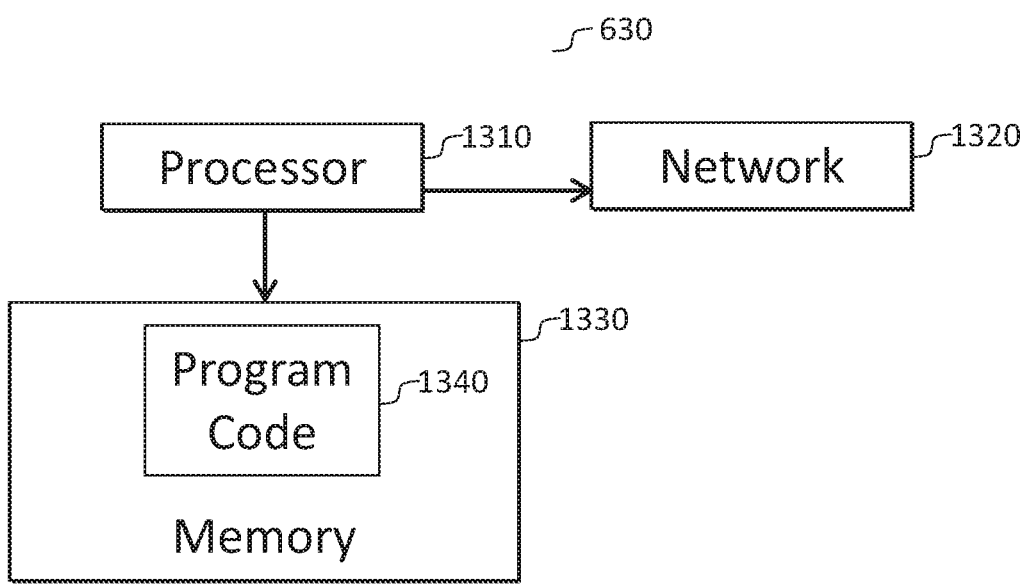
FIG. 13 is a block diagram schematically illustrating a 3D modeling system according to some embodiments of the inventive concepts.

FIG. 13 is a block diagram schematically illustrating a 3D modeling system according to some embodiments of the inventive concepts. Referring to FIG. 13, the 3D modeling system 630 may include a processor 1310, a network interface 1320, and a memory 1330 including computer readable program code 1340. In some embodiments, the 3D modeling system 630 may be a server of a cloud computing system. However, embodiments are not limited thereto.

The processor 1310 may include one or more data processing circuits, such as a general purpose and/or special purpose processor, e.g., microprocessor and/or digital signal processor, that may be collocated or distributed across one or more networks. The processor 1310 may be configured to execute the computer readable program code 1340 in the memory 1330 to perform at least some of the operations and methods of described herein as being performed by the device 100. The network interface 1320 may be used to communicate with the network interface 1220 of the device 100.

The memory 1230 may include a non-transitory computer readable storage medium having computer readable program code 1240 embodied in the medium. In some embodiments, a computer program product may include the non-transitory computer readable storage medium 1230 having the computer readable program code 1240 embodied in the medium 1230.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Some embodiments have been disclosed herein, in connection with the above description and the drawings. It will be understood that it would be unduly repetitious and obfuscating to literally describe and illustrate every combination and sub combination of these embodiments. Accordingly, the present specification, including the drawings, shall be construed to constitute a complete written description of some combinations and sub combinations of embodiments and of the manner and process of making and using them, and shall support claims to any such combination or sub combination. Many variations and modifications can be made to the embodiments without substantially departing from the inventive concepts. All such variations and modifications are intended to be included herein within the scope of the inventive concepts.

What is claimed is:

1. A method comprising:
    receiving a plurality of two-dimensional (2D) images of a physical object captured from a respective plurality of viewpoints in a three-dimensional (3D) scan of the physical object in a first process;
    receiving a first process 3D mesh representation of the physical object;
    calculating respective second process estimated position and/or orientation information for each one of the respective plurality of viewpoints of the plurality of 2D images;
    generating a second process 3D mesh representation of the physical object using the plurality of 2D images, the second process estimated position and/or orientation information, and the first process 3D mesh representation of the physical object;
    generating a 3D model of the physical object by applying surface texture information from the plurality of 2D images to the second process 3D mesh representation of the physical object;
    determining an initial depth map using the first process 3D mesh representation from a perspective of a reference one of the plurality of 2D images;
    selecting one or more surrounding ones of the plurality of 2D images based on the second process estimated position and/or orientation information;
    warping the one or more surrounding ones of the plurality of 2D images to appear from the perspective of the reference one of the plurality of 2D images; and
    calculating an updated depth map based on a combination of the reference one of the plurality of 2D images and the warped surrounding ones of the plurality of 2D images.

2. The method of claim 1, wherein the calculating the second process estimated position and/or orientation information and generating the second process 3D mesh representation are iteratively repeated.

3. The method of claim 1, further comprising:
    receiving camera parameters corresponding to the plurality of 2D images; and
    calculating updated camera parameters based on the plurality of 2D images.

4. The method of claim 1, further comprising:
    calculating surface normal vectors corresponding to positions in a 3D space of a plurality of feature points that are visible in ones of the plurality of 2D images,
    wherein the generating the second process 3D mesh representation of the physical object is based on the calculated surface normal vectors.

5. The method of claim 1, further comprising:
    receiving respective first process estimated position and/or orientation information for each one of the respective plurality of viewpoints of the plurality of 2D images; and
    receiving a feature point map comprising positions in a 3D space of a plurality of feature points that are visible in ones of the plurality of 2D images,
    wherein the calculating of the respective second process estimated position and/or orientation information comprises calculating the respective second process estimated position and/or orientation information for each of the respective plurality of viewpoints of the plurality of 2D images using the plurality of 2D images, the first process estimated position and/or orientation information, and the feature point map.

6. The method of claim 5, wherein the calculating of the respective second process estimated position and/or orientation information comprises:
    calculating an estimated location of a feature point of the plurality of feature points within a 2D image of the plurality of 2D images based on the first process estimated position and/or orientation information;
    identifying the feature point within the 2D image to determine an actual location of the feature point within the 2D image;
    determining a displacement between the estimated location of the feature point within the 2D image and the actual location of the feature point within the 2D image; and
    calculating a second process estimated position and/or orientation corresponding to the 2D image that yields a smaller displacement than the displacement determined using the estimated location based on the first process estimated position and/or orientation information.

7. The method of claim 6, wherein the calculating of the respective second process estimated position and/or orientation information further comprises minimizing a sum of displacements between a plurality of estimated locations of feature points of the plurality of feature points within ones of the plurality of 2D images.

8. The method of claim 1, wherein the first process comprises:
    capturing the plurality of 2D images using at least one camera;
    calculating first process estimated position and/or orientation information for each one of the respective plurality of viewpoints of the plurality of 2D images;
    calculating a feature point map comprising positions in a 3D space of a plurality of feature points that are visible in ones of the plurality of 2D images; and
    generating the first process 3D mesh representation of the physical object.

9. The method of claim 8, wherein the first process 3D mesh representation of the physical object is generated while capturing the plurality of 2D images.

10. The method of claim 8,
    wherein the 3D model is a second process 3D model, and
    wherein the first process further comprises generating a first process 3D model of the physical object by applying surface texture information from the plurality of 2D images to the first process 3D mesh representation of the physical object.

11. A computer program product comprising a non-transitory computer readable storage medium having computer readable program code embodied in the medium that when executed by a processor causes the processor to perform the method of claim 1.

12. A processing device, the processing device configured to perform the method of claim 1.

13. A method, performed by an electronic device, comprising:

capturing a plurality of two-dimensional (2D) images of a physical object captured from a respective plurality of viewpoints in a three-dimensional (3D) scan of the physical object using at least one camera;

calculating first process estimated position and/or orientation information for each one of the respective plurality of viewpoints of the plurality of 2D images;

calculating a feature point map comprising positions in a 3D space of a plurality of feature points that are visible in ones of the plurality of 2D images;

generating a first process 3D mesh representation of the physical object;

receiving a first process 3D model of the physical object by applying surface texture information from the plurality of 2D images to the first process 3D mesh representation of the physical object;

displaying the first process 3D model on a display of the electronic device;

providing an option to a user of the electronic device to further process the first process 3D model;

receiving a second process 3D model responsive to receiving instruction from the user to further process the first process 3D model, wherein the receiving of the second process 3D model comprises calculating respective second process estimated position and/or orientation information for each one of the respective plurality of viewpoints of the plurality of 2D images;

determining an initial depth map using the first process 3D mesh representation from a perspective of a reference one of the plurality of 2D images;

selecting one or more surrounding ones of the plurality of 2D images based on the second process estimated position and/or orientation information;

warping the one or more surrounding ones of the plurality of 2D images to appear from the perspective of the reference one of the plurality of 2D images; and calculating an updated depth map based on a combination of the reference one of the plurality of 2D images and the warped surrounding ones of the plurality of 2D images.

14. The method of claim 13, wherein the receiving of the second process 3D model further comprises:

generating a second process 3D mesh representation of the physical object using the plurality of 2D images, the second process estimated position and/or orientation information, and the first process 3D mesh representation of the physical object; and generating the second process 3D model of the physical object by applying surface texture information from the plurality of 2D images to the second process 3D mesh representation of the physical object.

15. The method of claim 14, wherein the second process 3D mesh representation and the second process 3D model are generated after the first process 3D mesh representation and the first process 3D model are generated.

16. The method of claim 13, further comprising:

sending the plurality of 2D images and the first process 3D mesh representation from the electronic device to an external processing device, wherein the receiving of the second process 3D model comprises receiving the second process 3D model from the external processing device.

17. A computer program product comprising a non-transitory computer readable storage medium having computer readable program code embodied in the medium that when executed by a processor causes the processor to perform the method of claim 13.

18. An electronic device, the electronic device configured to perform the method of claim 13.

19. A method comprising:

receiving a plurality of two-dimensional (2D) images of a physical object captured from a respective plurality of viewpoints in a three-dimensional (3D) scan of the physical object in a first process;

receiving a first process 3D mesh representation of the physical object;

calculating respective second process estimated position and/or orientation information for each one of the respective plurality of viewpoints of the plurality of 2D images;

generating a second process 3D mesh representation of the physical object using the plurality of 2D images, the second process estimated position and/or orientation information, and the first process 3D mesh representation of the physical object;

generating a 3D model of the physical object by applying surface texture information from the plurality of 2D images to the second process 3D mesh representation of the physical object;

receiving respective first process estimated position and/or orientation information for each one of the respective plurality of viewpoints of the plurality of 2D images; and receiving a feature point map comprising positions in a 3D space of a plurality of feature points that are visible in ones of the plurality of 2D images, wherein the calculating of the respective second process estimated position and/or orientation information comprises calculating the respective second process estimated position and/or orientation information for each of the respective plurality of viewpoints of the plurality of 2D images using the plurality of 2D images, the first process estimated position and/or orientation information, and the feature point map, and wherein the calculating of the respective second process estimated position and/or orientation information comprises:

calculating an estimated location of a feature point of the plurality of feature points within a 2D image of the plurality of 2D images based on the first process estimated position and/or orientation information;

identifying the feature point within the 2D image to determine an actual location of the feature point within the 2D image;

determining a displacement between the estimated location of the feature point within the 2D image and the actual location of the feature point within the 2D image; and calculating a second process estimated position and/or orientation corresponding to the 2D image that yields a smaller displacement than the displacement determined using the estimated location based on the first process estimated position and/or orientation information.

* * * * *